United States Patent
Riedemann et al.

(10) Patent No.: US 6,216,080 B1
(45) Date of Patent: Apr. 10, 2001

(54) WHEEL MODULE FOR A VEHICLE WITH AN ELECTRICALLY CONTROLLED BRAKING SYSTEM (EBS)

(75) Inventors: Henrich Riedemann, deceased, late of Hannover, by Donate Riedemann, legal representative; Thomas Wolf, Hannover, both of (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 09/450,863

(22) Filed: Nov. 29, 1999

(30) Foreign Application Priority Data

Nov. 27, 1998 (DE) ............................................. 198 54 788

(51) Int. Cl.[7] ................................. G06F 7/00; G06F 17/00
(52) U.S. Cl. ................................. 701/71; 701/74; 701/69; 701/70; 303/168; 303/170; 303/121; 318/52; 318/66; 318/77; 318/270
(58) Field of Search ................................. 701/71, 70, 69, 701/74; 303/121, 122.06, 138, 168, 169, 170, 171; 318/52, 55, 56, 66, 77, 270, 799

(56) References Cited

U.S. PATENT DOCUMENTS

| | | |
|---|---|---|
| 4,313,166 | 1/1982 | Konrad et al. . |
| 5,255,962 | 10/1993 | Neuhaus et al. . |
| 5,463,550 | 10/1995 | Körber et al. . |
| 5,476,311 | * 12/1995 | Fennel et al. .................... 303/122.06 |
| 6,026,343 | * 2/2000 | Ogino .................................... 701/72 |
| 6,087,826 | * 7/2000 | Donath . |
| 6,112,146 | * 8/2000 | Mueller .................................. 701/71 |

FOREIGN PATENT DOCUMENTS

| | | |
|---|---|---|
| 2851107 | 3/1990 | (DE) . |
| 4022671 | 1/1992 | (DE) . |
| 19627731 | 1/1998 | (DE) . |
| 9627731 | 1/1998 | (DE) . |
| 4135691 | 4/1998 | (DE) . |
| 0467112 | 6/1991 | (EP) . |

OTHER PUBLICATIONS

Decker et al., "Elektronisch geregelte Nutzfahrzeugbremse (Electronically Controlled Brakes for Commercial Vehicles)." 96 ATZ Automobiltechnische Zeitschrift, Sep. 1994, pp. 506–510.

* cited by examiner

Primary Examiner—William A. Cuchlinski, Jr.
Assistant Examiner—Olga Hernandez
(74) Attorney, Agent, or Firm—Proskauer Rose LLP

(57) ABSTRACT

A wheel module for the control of the braking force on a wheel of a vehicle with an electrically controlled braking system (EBS), in which the need for data transfer to other wheel modules, or to a central module, if present, is reduced considerably. All magnitudes required for an ABS regulation of a wheel such as, for example, vehicle reference speed, are calculated directly in the wheel module according to the invention, so that these magnitudes need not be transmitted from a central module via a data bus.

14 Claims, 3 Drawing Sheets

WHEEL MODULE FOR A VEHICLE WITH AN ELECTRICALLY CONTROLLED BRAKING SYSTEM (EBS)

BACKGROUND OF THE INVENTION

The invention relates to a wheel module for a vehicle with an electrically controlled braking system (EBS) for controlling the braking force on at least one wheel of the vehicle, and more particularly a wheel module which transmits an adjusting signal, computed thereby on the basis of a brake value and wheel specific signals transmitted thereto, to an actuator installed on the wheel for the adjustment of the braking force.

A wheel module of this type is disclosed, for example, in EP 0 467 112 (U.S. Pat. No. 5,255,962, which is incorporated herein by reference).

The known wheel module comprises part of an electrically controlled braking system which, in addition to the wheel modules, includes a central module and signal transmission devices, such as, for example, a brake signal transmitter. Such wheel module is assigned to a particular wheel of a vehicle. A signal representing the rotational speed of the wheel is produced by means of a speed sensor assigned to the wheel, and is transmitted to the wheel module assigned to the same wheel for evaluation. An electronic control system located in the wheel module, and including a microprocessor, calculates a speed signal based upon such evaluation, and transmits same via a data bus system. Several wheel modules, each of which emits a corresponding speed signal, are connected via the data bus system to the central module. The central module evaluates the speed signals received by the data bus system and, from this, calculates, for example, a vehicle reference speed which is required for an anti-lock brake system (ABS) regulation. This vehicle reference speed and, if applicable, additional calculation results required for an ABS regulation, are then sent back by the central module to the wheel modules, which then use the data for an ABS regulation on the wheels corresponding thereto.

Consequently, relatively large amounts of data must be exchanged via the data bus system among the modules connected to it.

It is therefore the object of the present invention to provide a wheel module and a braking system in which the need for data transfer is reduced.

SUMMARY OF THE INVENTION

In accordance with these and other objects of the invention, there is provided a wheel module for a vehicle equipped with an electrically controlled braking system (EBS) for controlling the braking force on a wheel of the vehicle. The wheel module receives a brake value representative of a desired target brake value for the wheel and transmits an adjusting signal to an actuator which is installed on the wheel for adjustment of the braking force. The wheel module includes a main regulating channel assigned to the wheel and at least one additional regulating channel, and in each of the regulating channels wheel-specific computing steps are carried out. A wheel-specific signal of the wheel and at least one additional wheel specific signal of an additional wheel is transmitted to the wheel module, and the adjusting signal, which is based upon the brake value and the wheel-specific signals, is computed in the main regulating channel by using computing results of the additional regulating channel or channels.

The invention provides the advantage that the need for data transfer among the modules of the braking system is greatly reduced, inasmuch as the calculation results required for brake control with ABS regulation are derived directly and locally in a wheel module from the input signals for calculated results, such as, a vehicle reference speed, slip signals, acceleration signals, braking force reduction, stop and/or resumption signals, rather than at a central location, i.e. in a central module which then transmits the results via the data bus system to the wheel modules. Furthermore, since an ABS regulation, in particular, is very time sensitive, regulating quality can also be improved, since time delays, normally attendant data transmission between the central module and the wheel module, are avoided. The wheel module according to the invention provides the further advantage that the ABS regulating process can continue to be operational, without limitations, even following a failure of the central module. Thus, a process referred to as modified individual regulation, such as that disclosed, for example, in DE 28 51 107 C2 (U.S. Pat. No. 4,313,166, which is incorporated herein by reference), can be carried out on a steerable axle, even without a central module to attenuate yawing moment changes. Additional regulating principles, which are familiar to the skilled artisan, such as, for example, variable axle regulation or modified axle regulation, can be applied with or without a central module.

Because the same control program can be provided in every wheel module, the invention provides the further advantage that development costs are relatively low, since only a single control program need be provided in a vehicle, regardless of the number of installed wheel modules.

In an advantageous further development of the invention, the assignment of the wheel of a wheel module is effected by entering a wheel position parameter into an electronic control system provided in the wheel module. This provides the advantage that identical wheel modules can be produced, and, only at a relatively later point in time, for example, at the time of their installation in a vehicle, are their functions assigned in detail. A wheel assignment is necessary in order to carry out the ABS regulation on, for example, a steerable axle of a vehicle, according to a principle, such as, for example, a modified individual regulation as mentioned above, which is different from one applicable to a non-steerable axle of the vehicle and on which, for example, individual regulation is carried out.

The wheel position parameter can be entered manually, for example, by operating a diagnostic device which transmits the appropriate data to the wheel modules. In an advantageous further development of the invention, a central module is provided in the braking system, and the central module assigns the wheel assignment automatically, for example, one time during the first installation of the braking system. For this purpose, information on the wheel assignment and the braking system are stored in the central module.

In order to carry out certain regulating functions in which the speed of several wheels must be available, for example, modified individual regulation, it is necessary for certain wheel modules to transmit the speed signal calculated by their respectively assigned rotational speed sensors via the data bus system. In an advantageous further development of the invention, however, not all wheel modules transmit their respective speed signal. Rather, only those wheel modules whose speed signals are needed in other wheel modules transmit a speed signal. In this manner, the need for data transfer is kept at a low level. The electronic control system of a wheel module is able to recognize, advantageously through the wheel position parameter, whether the speed signal should be transmitted through the data bus system or not.

In an advantageous further development of the invention, wheel modules which are installed on a third or additional vehicle axle, i.e. not on a steerable or on the driven axle, do not transmit any speed signal via the data bus system as a result of the determination of the wheel assignment. The brake system can thereby be expanded in a modular manner to a number of wheel modules that is, in principle, unlimited, as required by the vehicle, without significantly increasing the need for data transfer and without requiring special adaptation tasks.

In accordance with an advantageous embodiment of the invention, a braking system is equipped with several wheel modules of the type described above, as well as with a central module. These modules are connected to each other via one or more data bus systems for the exchange of information among each other. The central module in such embodiment preferably serves for the execution of central brake control functions which are needed only once in the vehicle. In this regard, functions referred to as brake management functions are thus preferably assigned to the central module. This is understood, for example, to be an axle-load dependent braking force distribution function, a braking force distribution function promoting uniform wear of the brake linings or regulation of the vehicle deceleration. The central module can also carry out additional central functions such as, for example, an engine control as part of a drive slip regulation.

The above, and other objects, features and advantages of the present invention will become apparent from the following description read in conjunction with the accompanying drawing, in which like reference numerals designate the same elements and functions.

DETAILED DESCRIPTION OF THE PREFERRED EMBODIMENT

Figure 1:
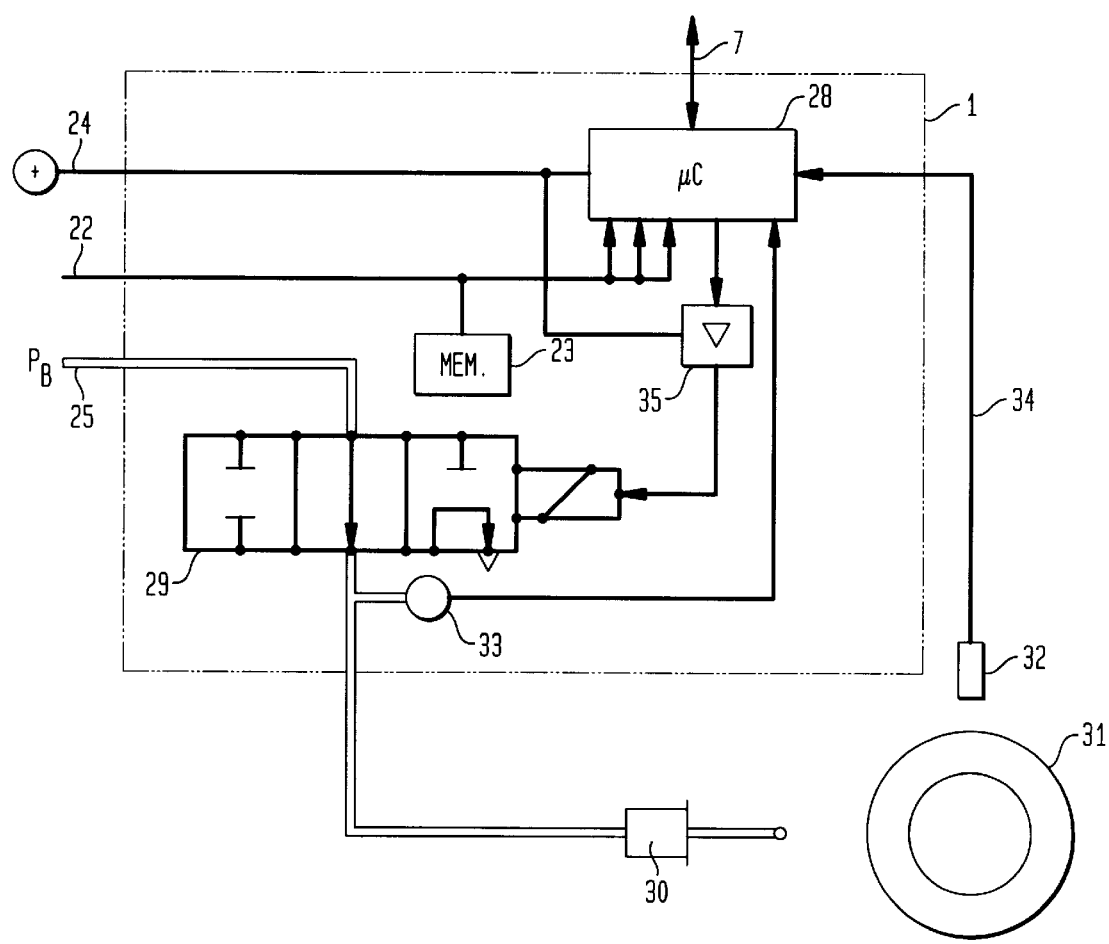
FIG. 1 is a schematic representation of a wheel module according to an embodiment of the invention.

Referring now to the figures, and in particular FIG. 1, the internal structure of a wheel module, generally designated by the reference numeral 1, is schematically depicted. For the sake of greater clarity, depiction of the various control elements comprising an electronic control system installed in the wheel module 1 is restricted to a microcomputer 28, a non-volatile memory device 23 and an output amplifier 35. Other additional control elements, such as level adapters, analog/digital converters, drivers, etc., which are normally provided in practice and which are therefore known to the person skilled in the art, are not shown in any detail.

The microcomputer 28, which is advantageously a 16-bit microcomputer, such as, for example, a Motorola model 68010, is supplied with operating current via an electric cable 24. The microcomputer 28 is connected via a data bus system 7 to additional wheel modules and, if applicable, also to a central module. A CAN data bus is advantageously used as the data bus system 7.

When necessary, the microcomputer 28 emits an adjusting signal via an output amplifier 35 to a valve arrangement 29. The valve arrangement 29 is provided in the form of a 3/3 way valve. A supply pressure $P_B$, which the valve arrangement 29 receives via a pressure medium channel 25, can be put through thereby, on the output side thereof, as a function of the adjusting signal, to a brake cylinder 30 connected to the wheel module 1 and serving for the mechanical actuation of a wheel brake connected to a wheel 31.

In the case of different adjusting signals, the braking pressure in the brake cylinder 30 can be reduced or held to an existing value by operation of the valve arrangement 29. In the two latter instances, the brake cylinder 30 is not connected to the supply pressure $P_B$. The braking pressure, which is present in the brake cylinder 30 and which represents the actual braking force, is converted, by means of a pressure sensor 33, into an electric signal which is transmitted to the microcomputer 28.

In addition, a signal produced by means of a rotational speed sensor 32 is transmitted to the microcomputer 28 for evaluation via an electric cable 34. The rotational speed sensor 32 is preferably an electromagnetically-acting rotational speed indicator which interacts with a pole wheel provided with a plurality of teeth, which is not shown in FIG. 1. The signal produced as a result of the rotation of the pole wheel comprises a sequence of voltage impulses, the time interval between which represents a measure of the rotational speed of the wheel 31. The microcomputer 28 computes a speed signal from the time intervals, while utilizing additional information which is stored in the wheel module, such as, for example, the circumference of the wheel 31.

Signals of additional sensors, for example, a brake lining wear sensor, are transmitted to the microcomputer 28 via an electrical cable 22. The microcomputer 28 is furthermore able to read data from a non-volatile memory device 23, for example, an EEPROM, via the cable 22, or write data into same. Information, such as, for example, the wheel position parameter and the circumference of the wheel 31, can be stored in the memory device 23.

The microcomputer 28 receives a brake value from the data bus system 7, which indicates the target braking force to be imposed on the wheel 31. The brake value is transmitted either directly by a brake signal transmitter connected to the brake pedal, or by a central module connected to the brake signal transmitter. The wheel module is responsible for converting this brake value into a corresponding braking force, or a braking pressure in the brake cylinder 30, so that the vehicle is braked as indicated by the brake pedal actuation.

In the event that an initiation of a locking of the wheel 31 is detected, the braking pressure is reduced in a known manner, in variance from the brake value which would normally be set within the framework of an ABS regulating process, or is modulated through continuous adaptation in such manner that the slip of the wheel 31 is adjusted to a constant value of approximately 20%, through evaluation of the signal supplied by the rotational speed sensor 32. Within the framework of the ABS regulating process, additional speed signals of other wheel modules, in addition to the speed signal produced by the rotational speed sensor 32, are taken into account in the microcomputer 28.

The wheel module 1 can also be integrated structurally into the brake cylinder 30, resulting in a very compact structure and simplified assembly.

In another advantageous embodiment, several brake cylinders which are assigned to the wheels of a wheel or axle group of the vehicle, and which should be subjected to the same braking pressure, can be connected to the wheel module instead of just one brake cylinder. In such instance, the wheel module would be adapted for connection with one or several additional rotational speed sensors which would serve to sense the rotational speed of the other wheels of the wheel or axle group.

Figure 2:
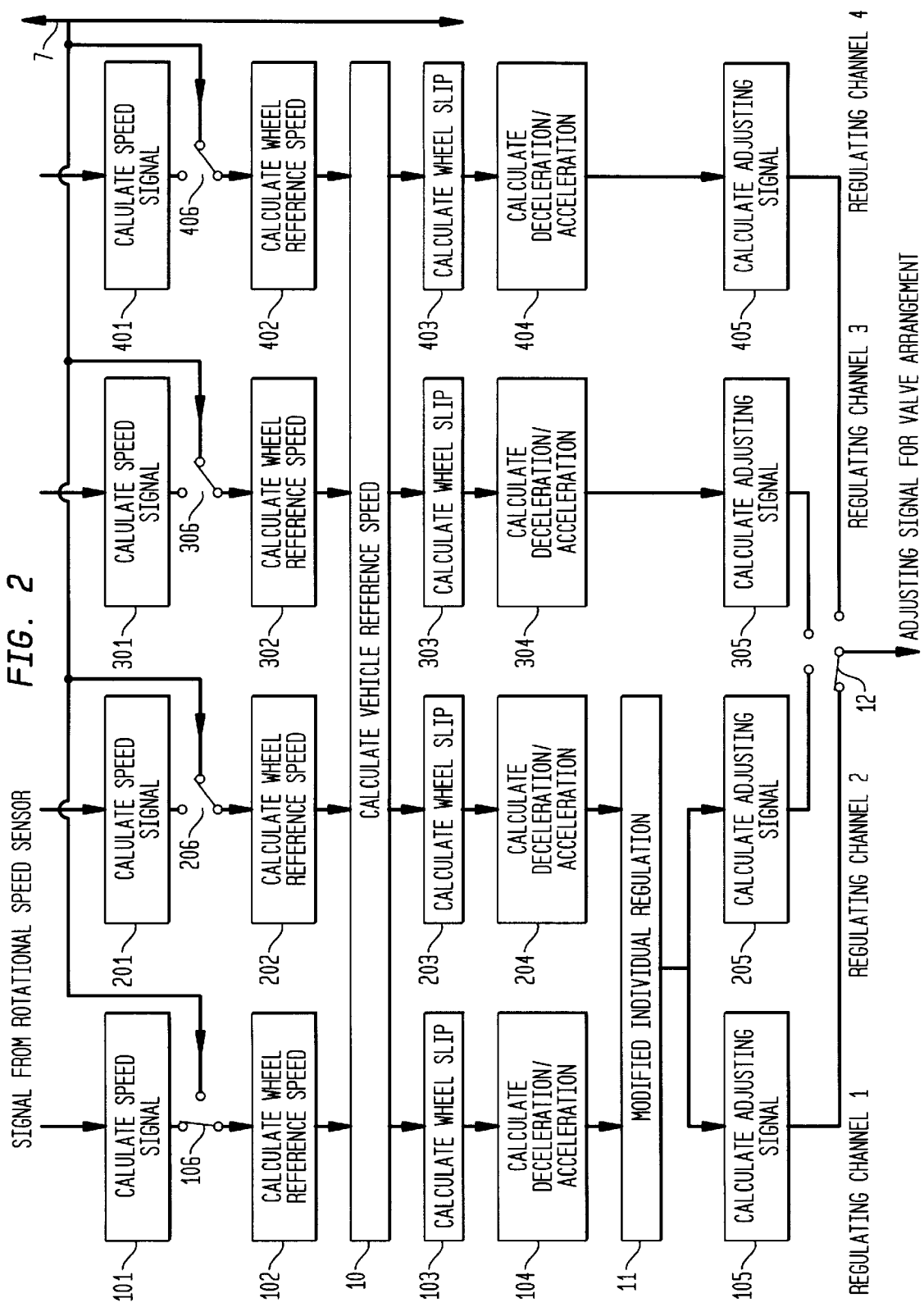
FIG. 2 is a flow chart of the program steps to be carried out in a wheel module for ABS regulation.

Turning now to FIG. 2, a sequence of individual program steps of an ABS regulating process, executed in the microcomputer 28, is shown as an example. The ABS regulating process consists in principle of identical program steps 101, 102, 103, 104, 105, 201, 202, 203, 204, 205, 301, 302, 303, 304, 305, 401, 402, 403, 404, 405, associated with the respective wheels, and also, of common program steps 10, 11 applicable to several or all wheels. The identical program steps associated with the wheels are also referred to as regulating channels.

In the example of FIG. 2, four regulating channels are represented. Regulating channel 1 consists of the program steps 101, 102, 103, 104, 105, regulating channel 2 consists of the program steps 201, 202, 203, 204, 205, regulating channel 3 consists of the program steps 301, 302, 303, 304, 305 and regulating channel 4 consists of the program steps 40, 402, 403, 404, 405. Depending upon the application, it is also possible to provide a different number of regulating channels, for example, two or three regulating channels.

Each regulating channel is provided, in principle, for the processing of an input signal of a rotational speed sensor and for emitting an adjusting signal for a valve arrangement. The ABS regulating process represented in FIG. 2 could therefore be used in a suitable control device for the ABS regulation of four wheels of a vehicle, thereby operating in the manner of a four-channel ABS system.

In contrast with a four-channel ABS, the electronic control system provided in the wheel module 1 is adapted for connection with only one rotational speed sensor 32 and one valve arrangement 29. For this reason, the signal of the rotational speed sensor 32 is transmitted for evaluation to only one of the regulating channels, which shall be referred to hereinafter as the main regulating channel. The other regulating channels, hereinafter referred to as additional regulating channels, obtain their speed information from the data bus system 7. A logical switch 106, 206, 306, 406, which can be adjusted by means of programming of the wheel module within the framework of wheel assignment, is provided in each regulating channel for the selection of the data source for speed information.

In the same manner, a logical selection switch 12 is provided for the transmission of the adjusting signals computed by the four regulating channels, the selection switch 12 being programmable in the same manner, and preferably programmed in such manner that the adjusting signal is transmitted by the main regulating channel to the valve arrangement 29.

In the example of FIG. 2, the regulating channel 1 is defined, per wheel assignment of the wheel module, as the main regulating channel. The regulating channel 1 is provided for an ABS regulation of a wheel located on a steerable front axle of a vehicle, as is the regulating channel 2.

Several program steps of an ABS regulation, which are known in detail to a person schooled in the art, are executed between the input of the speed signals into the regulating channels and the output of the adjusting signal. Examples of the program steps, as shown, are:

Calculation of the speed signal 101, 201, 301, 401,
Calculation of wheel reference speed 102, 202, 302, 402,
Calculation of vehicle reference speed 10,
Calculation of wheel slip 103, 203, 303, 403,
Calculation of deceleration/acceleration 104, 204, 304, 404,
Modified individual regulation 11, and
Calculation of adjusting signal 105, 205, 305, 405.

The program steps 101, 201, 301, 401 are provided for a conversion of the signals emitted by the rotational speed sensor 32, for example, the sequence of impulses with variable time interval, into the speed signal which can be processed by the subsequent program steps. In the example of the present embodiment, the signal of the rotational speed sensor 32 is processed in program step 101. The regulating channels 2, 3 and 4 receive their speed information from the data bus system 7, as mentioned above. In addition to being used in the regulating channel 1, the speed signal computed in the program step 101 is furthermore emitted on the data bus system 7 (not shown). As seen in FIG. 2, wheel-specific reference speed for each regulating channel is calculated (program steps 102, 202, 302, 402), referred to as the wheel reference speed. In a subsequent common program step 10, a common vehicle reference speed is computed as a first intermediate result of the computation from all the previously calculated wheel reference speeds.

With the help of the common vehicle reference speed, a wheel slip for each wheel is then calculated in each regulating channel (program steps 103, 203, 303, 403). In addition, the momentary deceleration or acceleration is also calculated for each wheel in each regulating channel (program steps 104, 204, 304, 404).

In a following program step 11, an additional intermediate result is calculated for the regulating channels 1 and 2, such intermediate result causing an attenuation of the yawing moment on the front axle upon the final calculation of the adjusting signal for the valve arrangement, in a manner in accordance with the previously mentioned modified individual regulation.

By using this additional intermediate result, a respective adjusting signal is then calculated in the individual regulating channels 1 and 2.

An individual regulation is carried out for the regulating channels 3 and 4 assign to the rear wheels of a vehicle in the example of the embodiment of FIG. 2, i.e. no intermediate result is calculated for a modified individual adjustment. For this reason, a respective adjusting signal is calculated without calculating additional intermediate results in the regulating channels 3 and 4.

If, for example, a variable axle regulation were to be applied to the rear wheels, a program step common to the regulating channels 3 and 4, and similar to the program step 11, would be provided between the program steps 304, 404 and 305, 405, in which computation steps would then be executed for the previously-mentioned variable axle regulation.

In accordance with the above-described program structure, the main regulating channel which ultimately produces the adjusting signal for the valve arrangement 29 is supplied with an especially frequently updated and therefore very recent speed information due to the direct tie to the signal from the rotational speed sensor 32 assigned to the wheel module. The additional regulating channels receive their speed information from the data bus system 7, as a rule, with a lower updating frequency. As a result, regulation of a high quality can be achieved on the wheel with dynamic processes, especially with regard to the ABS regulation.

In accordance with the embodiment described with reference to FIG. 2, the wheel position parameter comprises information on the setting of the logical switch 106, 206, 306, 406, 12. The number of the main regulating channel can, for example, also be used as a wheel position parameter, i.e. in the present example, the wheel position parameter would then have to be set to value 1. The adjustment of the logical switch 106, 206, 306, 406, 12 would then be derived by the microcomputer 28 from this value.

Instead of the above-described program structure with four regulating channels, a different number of regulating channels could also be used.

Figure 3:
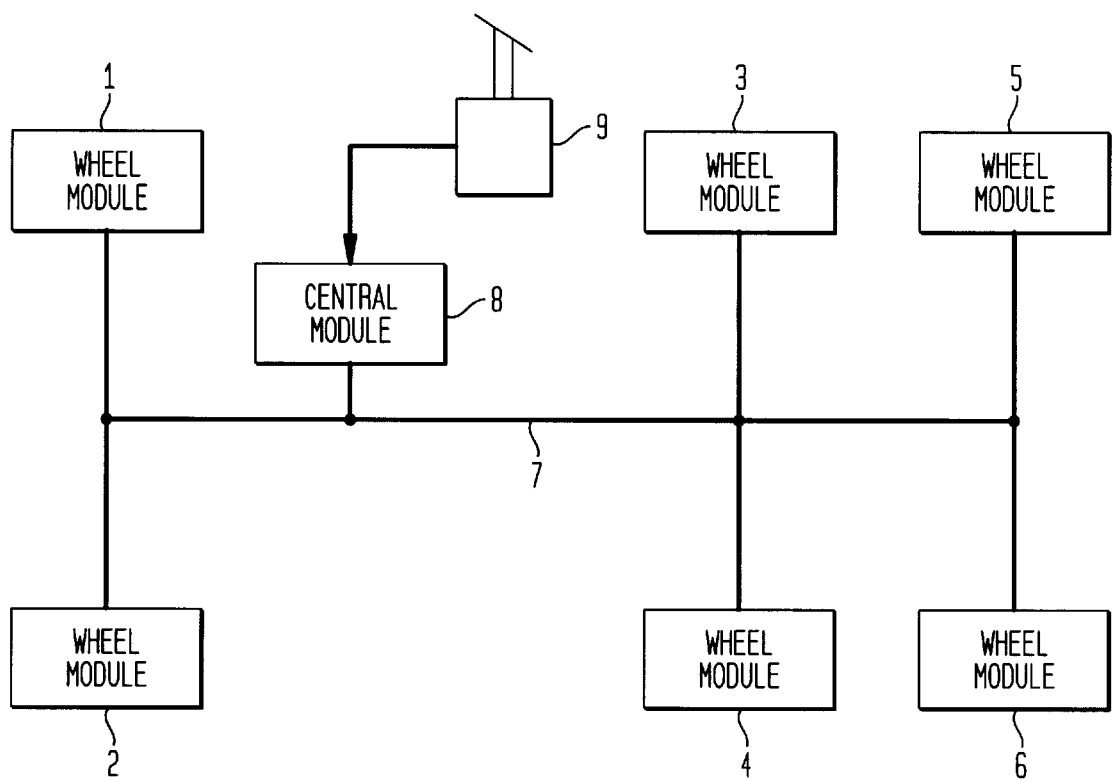
FIG. 3 is a schematic representation of an electronically controlled braking system with several wheel modules and one central module.

Referring now to FIG. 3, an arrangement of wheel modules 1, 2, 3, 4, 5, 6 and a central module 8 which serves to control the braking system of a three-axle vehicle, for example, with a front axle and two rear axles, is depicted. The wheel modules 1, 2, 3, 4, 5, 6 are connected among each other, and to the central module 8, via the data bus system 7. All the wheel modules 1, 2, 3, 4, 5, 6 are of the same type, i.e. they include the structure as described in FIG. 1, and the program structure according to FIG. 2. The central module 8 is connected to a brake signal transmitter 9 which emits a signal representing the brake actuation carried out by the driver. This signal is processed in the central module 8. The processing result is transmitted via the data bus system 7 to the wheel modules 1, 2, 3, 4, 5, 6 as a target brake value. Among other things, the central module executes central, vehicle-wide brake control functions during this processing such as, for example, axle load-dependent braking force distribution. For this purpose, the signals of additional sensors, for example, information from the wheel modules, are available to the central module 8 (not shown).

The central module 8 preferably transmits information concerning the wheel assignment of a wheel module to each of the wheel modules during a first-time start-up of the braking system or of the vehicle. This information is then stored in a wheel module in the non-volatile memory device 23 and, from then on, is constantly available.

The central module 8 and the brake signal transmitter 9 can also be combined in one component.

As mentioned previously, it is also possible to carry out electrical control of the braking system without using the central module 8, by using only wheel modules 1, 2, 3, 4, 5, 6. In such case, the brake signal transmitter 9 would be connected directly to the data bus system 7 via a suitable interface arrangement. The brake value emitted by the brake signal transmitter would then represent the driver's braking intention. The determination of the wheel assignment of the wheel modules would be carried out by using a diagnostics device connected preferably to the data bus system 7 at the first start-up of the braking system. The diagnostics device would then be removed upon completion of the assignment procedure.

In the arrangement shown in FIG. 3, the wheel modules 1, 2 are assigned to the steerable front axle of a vehicle. The wheel modules 3, 4 are assigned to a rear axle, for example, the drive axle of the vehicle. The wheel position parameters in the wheel modules 1, 2, 3, 4 are adjusted in such manner that the adjustment signal is transmitted to the regulating channel of the valve arrangement 29, a regulating channel number of which is the same as the numbering of the corresponding wheel module according to FIG. 3. In other words, the regulating channel 1 is defined as the main regulating channel in wheel module 1, regulating channel 2 is the main regulating channel in wheel module 2, etc.

The wheel modules 5, 6 are assigned to an additional rear axle of the vehicle. The wheel assignment of these wheel modules 5, 6 has been effected in the same manner as for the wheel modules 3, 4, which are also assigned to a rear axle. Consequently, the regulating channel 3 has been determined to be the main regulating channel in the wheel module 5 while the regulating channel 4 was determined to be the main regulating channel in wheel module 6. If additional wheel modules are used, they would be given a similar wheel assignment as a function of the type of wheel axle to which they are assigned.

Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. A braking system, comprising:

wheel modules each including a main regulating channel assigned to the wheel and at least one additional regulating channel, where in each regulating channel wheel-specific computing steps are carried out, a target brake value, a wheel-specific signal of the wheel and at least one additional wheel specific signal of an additional wheel being transmitted to each of the wheel modules, and an adjusting signal, which is based upon the target brake value and the wheel-specific signals, being computed in the main regulating channel by using computing results of the at least one additional regulating channel; and a central module for central execution of vehicle-wide brake control functions, the central module being is connected to the wheel modules via one or several data bus systems for exchange of information therebetween.

2. A braking system according to claim 1, wherein the central module transmits information on the wheel assignment of a wheel module to the wheel module.

3. A wheel module for a vehicle equipped with an electrically controlled braking system (EBS) for controlling the braking force on a wheel of the vehicle, the wheel module being of a type which receives a desired target brake value for the wheel and which transmits an adjusting signal to an actuator which is installed on the wheel for adjustment of the braking force, the wheel module comprising:

a main regulating channel assigned to the wheel and at least one additional regulating channel, where in each regulating channel wheel-specific computing steps are carried out;

a wheel-specific signal of the wheel and at least one additional wheel specific signal of an additional wheel being transmitted to the wheel module; and the adjusting signal, which is based upon the brake value and the wheel-specific signals, being computed in the main regulating channel by using computing results of the at least one additional regulating channel.

4. A wheel module according to claim 3, wherein the wheel-specific signal of the wheel is transmitted to the wheel module at a higher repetition frequency than the additional wheel-specific signal of the additional wheel.

5. A wheel module according to claim 3, wherein the wheel-specific signal is a signal indicating a rotational speed of the wheel.

6. A wheel module according to claim 3, further comprising an electronic control device, a particular wheel assignment being determined by entering a wheel position parameter in said electronic control device.

7. A wheel module according to claim 3, wherein:

the wheel-specific computing steps contain calculating steps for an anti-lock brake system (ABS) regulation of a wheel in which intermediate results are formed; and the adjusting signal is calculated by using the intermediate results.

8. A wheel module according to claim 7, wherein the intermediate results include at least one selected from the group consisting of slip signals, acceleration signals, braking force reduction signals, braking force retention signals and braking force resumption signals.

9. A wheel module according to claim 3, further comprising an additional sensor, a signal representing an actual braking force on the wheel being evaluated by the additional sensor.

10. A wheel module according to claim 9, wherein the additional sensor is a pressure sensor.

11. A wheel module according to claim 3, in combination with a rotational speed sensor connected to the wheel module for determining a rotational speed of the wheel.

12. The combination according to claim 11, wherein a signal received from the rotational speed sensor or a signal derived therefrom is emitted via a data channel when the wheel module is assigned to a steerable or driven axle of a vehicle.

13. The combination according to claim 12, wherein the data channel is a data bus system.

14. The combination according to claim 11, wherein a signal received from the rotational speed sensor or a signal derived therefrom is not emitted via the data channel when the wheel module is assigned to a third or additional vehicle axle.

* * * * *